United States Patent
Schnegelberger et al.

(10) Patent No.: US 9,471,594 B1
(45) Date of Patent: *Oct. 18, 2016

(54) DEFECT REMEDIATION WITHIN A SYSTEM

(71) Applicant: EMC Corporation, Hopkinton, MA (US)

(72) Inventors: Eric Schnegelberger, Youngsville, NC (US); Mark Chamness, Menlo Park, CA (US)

(73) Assignee: EMC Corporation, Hopkinton, MA (US)

( * ) Notice: Subject to any disclaimer, the term of this patent is extended or adjusted under 35 U.S.C. 154(b) by 113 days.

This patent is subject to a terminal disclaimer.

(21) Appl. No.: 14/042,501

(22) Filed: Sep. 30, 2013

(51) Int. Cl.
*G06N 3/08* (2006.01)
*G06F 17/30* (2006.01)

(52) U.S. Cl.
CPC .............................. *G06F 17/30221* (2013.01)

(58) Field of Classification Search
CPC ................................................ G06F 17/30221
See application file for complete search history.

(56) References Cited

U.S. PATENT DOCUMENTS

| | | | | |
|---|---|---|---|---|
| 5,928,369 | A * | 7/1999 | Keyser | G06F 11/0766 714/47.3 |
| 6,918,059 | B1 | 7/2005 | Galuten et al. | |
| 7,203,864 | B2 | 4/2007 | Goin et al. | |
| 7,421,695 | B2 * | 9/2008 | Murray | H04L 29/06 709/223 |
| 7,788,536 | B1 | 8/2010 | Qureshi et al. | |
| 7,937,623 | B2 | 5/2011 | Ramacher et al. | |
| 2004/0012808 | A1 * | 1/2004 | Payne | G06F 11/0733 358/1.15 |
| 2005/0015492 | A1 * | 1/2005 | Kumbalimutt | H04L 67/1006 709/226 |
| 2005/0114739 | A1 | 5/2005 | Gupta et al. | |
| 2005/0120105 | A1 | 6/2005 | Popescu et al. | |
| 2005/0278213 | A1 * | 12/2005 | Faihe | G06F 11/2257 702/183 |
| 2006/0085785 | A1 | 4/2006 | Garrett | |
| 2006/0184529 | A1 | 8/2006 | Berg et al. | |
| 2006/0212453 | A1 * | 9/2006 | Eshel | G06F 11/2025 |
| 2006/0221815 | A1 * | 10/2006 | Matsumoto | H04L 12/2602 370/216 |
| 2007/0192326 | A1 * | 8/2007 | Angal | G06F 11/1482 |
| 2007/0220036 | A1 * | 9/2007 | Das | G06Q 10/00 |

(Continued)

OTHER PUBLICATIONS

Chamness et al., U.S. Appl. No. 13/928,810, filed Jun. 27, 2013.

(Continued)

*Primary Examiner* — Philip Chea
*Assistant Examiner* — Wuji Chen
(74) *Attorney, Agent, or Firm* — Blakely, Sokoloff, Taylor & Zafman LLP

(57) ABSTRACT

Defect remediation in a system is disclosed. A defect is mapped to one or more remediation actions, at least in part by using a processor to generate and perform a defect-based query against one or more structured remediation action records. A remediation package is generated using the processor. The remediation package may include the one or more remediation actions and data associated with the defect. The remediation package may be sent to a destination associated with the defect.

20 Claims, 3 Drawing Sheets

(56) References Cited

U.S. PATENT DOCUMENTS

| | | | |
|---|---|---|---|
| 2007/0226546 A1* | 9/2007 | Asthana | G06F 11/3688 714/47.1 |
| 2008/0040628 A1 | 2/2008 | Mandal | |
| 2008/0126773 A1 | 5/2008 | Martinez et al. | |
| 2008/0133208 A1 | 6/2008 | Stringham | |
| 2008/0133540 A1 | 6/2008 | Hubbard et al. | |
| 2008/0313274 A1* | 12/2008 | Murray | H04L 29/06 709/203 |
| 2009/0106363 A1 | 4/2009 | Fallen et al. | |
| 2010/0064285 A1* | 3/2010 | Dechovich | G06F 11/0748 717/173 |
| 2010/0077008 A1 | 3/2010 | Davis et al. | |
| 2011/0131453 A1 | 6/2011 | Fernandess et al. | |
| 2011/0131645 A1* | 6/2011 | Johnson | G06F 11/0709 726/12 |
| 2012/0041575 A1 | 2/2012 | Maeda et al. | |
| 2012/0078837 A1* | 3/2012 | Bagchi | A61B 5/00 706/52 |
| 2012/0130968 A1 | 5/2012 | Mule | |
| 2012/0226943 A1 | 9/2012 | Alderman et al. | |
| 2012/0303618 A1 | 11/2012 | Dutta et al. | |
| 2013/0007527 A1* | 1/2013 | Petukhov | G06F 11/0793 714/37 |
| 2013/0054822 A1* | 2/2013 | Mordani | H04L 67/1034 709/228 |
| 2013/0073552 A1 | 3/2013 | Rangwala et al. | |
| 2013/0091266 A1 | 4/2013 | Bhave et al. | |
| 2013/0254599 A1 | 9/2013 | Katkar et al. | |

OTHER PUBLICATIONS

Chamness et al., U.S. Appl. No. 13/928,937, filed Jun. 27, 2013.
Schnegelberger et al., U.S. Appl. No. 14/038,312, filed Sep. 26, 2013.
Chamness et al., U.S. Appl. No. 14/042,491, filed Sep. 30, 2013.
Schnegelberger et al., U.S. Appl. No. 14/042,494, filed Sep. 30, 2013.

* cited by examiner

DEFECT REMEDIATION WITHIN A SYSTEM

BACKGROUND OF THE INVENTION

When a defect (e.g., a bug) is diagnosed in a system, technical support personnel, engineers, and software designers must quickly generate a set of remediation actions to correct the defect. The remediation actions must then be routed to a person or system to implement the remediation action. Typically, this process involves manual review of defect information and remediation actions as well as user-assisted routing of remediation information to a person or destination. These processes may be costly and inefficient.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automatically generating a remediation package for a defect and sending the package to an appropriate destination is disclosed. The remediation package may be sent to a system, user, or other destination to quickly and efficiently remedy the defect. Such an approach, in various embodiments, allows engineers and support technicians to quickly identify and implement fixes for defect(s) in systems without the need for manual review and analysis of defect and remediation information.

Figure 1:
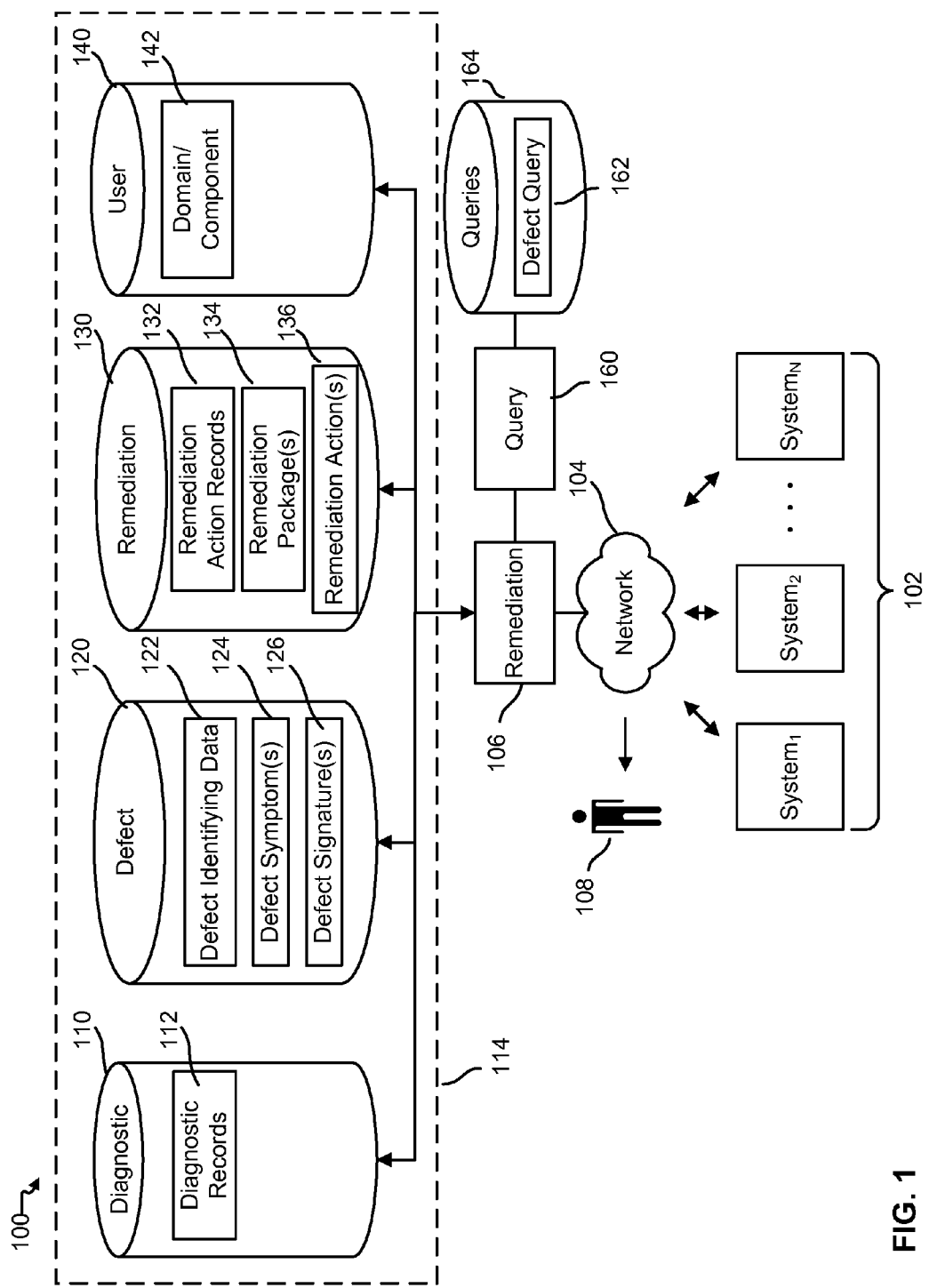
FIG. 1 is a diagram showing an automated system for defect remediation.

FIG. 1 is a diagram showing an automated system for defect remediation. An automated system for defect remediation 100 may be associated with one or more serviced systems 102 (e.g., storage system(s), back-up storage devices, servers, Data Domain deduplication storage systems, client(s), or any computer-related system(s)). System 100 may be associated with a defect tracking system (e.g., communicate with a defect tracking system via network 104).

Serviced systems 102 may communicate with system 100 via a network 104 (e.g., local area network, a wide area network, the Internet, or any appropriate communication network). The serviced systems 102 may send system diagnostic data to system 100, and the system diagnostic data may be received at system 100. For example, system diagnostic data may be received periodically (e.g., once a day) at system 100. Any appropriate protocol may be used to transport the diagnostic data, including syslog, email message(s), Hypertext Transfer Protocol (HTTP), Hypertext Transfer Protocol Secure (HTTPS), or Simple Network Management Protocol (SNMP). Upon receipt, the system diagnostic data may be parsed and otherwise processed by system 100 to generate one or more structured records. In some embodiments, the structured records of system diagnostic data 112 (e.g., structured diagnostic records) may be stored in diagnostic data repository 110 (e.g., a database). A diagnostic data repository 110 may include system diagnostic data from one or more systems 102 (e.g., received from the systems 102 over a period of time).

In some embodiments, system 100 may be associated with an organization's computer network (e.g., an enterprise computer network), and the serviced systems 102 may include one or more devices managed within that organization. In other embodiments, system 100 may be associated with a system manufacturer (e.g., a data storage product manufacturer), and the serviced systems 102 may include devices purchased from and supported by the system manufacturer. The system manufacturer may, for example, provide technical support to ensure optimal function of the serviced systems 102.

In some embodiments, system 100 may include or be associated with a knowledge repository 114. Knowledge repository 114 may include, for example, database(s), storage device(s), memory, or other system(s). Knowledge repository 114 may include a system (e.g., a database) configured or optimized to return search results quickly. Knowledge repository 114 may include system diagnostic data 110, defect information 120, remediation information 130, user information 140, and other suitable information. In an instance when system 100 is associated with a system manufacturer, knowledge repository 114 may include information associated with devices purchased from the system manufacturer.

According to some embodiments, defect information may be received (e.g., from an engineer, programmer, or other user) at system 100. A defect may include a bug (e.g., an undesirable condition related to a system), error, or other condition associated with a system that causes the system to deviate from standard/optimal operation. Defect information may include any information associated with a defect (e.g., information describing a defect). Defect information may include, for example, defect symptom data, defect signature(s), system-related information (e.g., software or hardware version, domain and component associated with system), defect severity, defect remediation information, and/or other information associated with a defect. Defect symptom data may include data that indicates the presence of a defect. Thus, the presence of defect symptom data in system diagnostic data may indicate that an associated defect is present and/or has manifested itself in a particular system 102 in which the defect symptom data is found to be present. Defect symptom data may include, for example, environmental measurements, component status, configuration settings, policy definitions, logs of system events (e.g., system failures), code level(s) associated with system events, and/or logs of system behavior (e.g., central processing unit (CPU) usage, input/output data). And, a defect signature (e.g., a bug signature) may include defect symptom data which is associated with (e.g., matches, is representative of) a defect. A bug signature may include a collection of symptom data associated with a bug.

According to some embodiments, remediation information 130 may be received (e.g., from an engineer, programmer, or other user) at system 100. The remediation information 130 may be processed (e.g., parsed, filtered, and/or otherwise processed) into one or more structured remediation action records 132 (e.g., collectively remediation action data). The structured remediation records 132 may be stored in a database (e.g., a table, array, index, or data structure). Remediation action records 132 may include information associated with remediation action(s) 136 or may include remediation actions 136. Remediation action records 132 may include one or more actions (e.g., remediation actions, a set of actions) to resolve, correct, bypass, or otherwise remediate a defect. Remediation actions 136 may include scripts, upgrade/update recommendations, instructions to fix a defect (e.g., a document including instructions), and/or any other information that may be useful in correcting a defect associated with a serviced system 102. Remediation actions 136 may include fixes (e.g., temporary fixes, workarounds, and/or permanent fixes) for defects in a system.

By way of example, a remediation action 136 may include a script (e.g., code, machine-executable instructions) which when executed by a serviced system 102 remediates, corrects, or bypasses a defect associated with the serviced system 102. The script when performed/executed by a serviced system 102 may, for example, install a patch that corrects a bug in the software or hardware. A remediation action 136 may, in some cases, automatically upgrade the software (e.g., operating system software) associated with a serviced system 102. In some cases, remediation actions 136 may be applied on serviced systems 102 without substantial impact on performance of serviced systems 102. For example, a rich client (e.g., agent) on the serviced system 102 may cause the remediation actions 136 to be performed on the serviced system 102. In some cases, system 100 and one or more serviced systems 102 may communicate via a network protocol (e.g., Secure Shell (SSH), virtual private network (VPN), Hypertext Transfer Protocol (HTTP), Hypertext Transfer Protocol Secure (HTTPS), or email). System 100, or component thereof, may communicate with serviced systems 102 to perform remediation actions 136 on the serviced systems 102. For example, the remediation actions 136 may include configuration changes, command line interface (CLI) command execution(s), or other actions.

In some embodiments, remediation actions 136 (e.g., stored in remediation action records 132) may include update/upgrade recommendation(s) (e.g., upgrade path(s)). For example, the update recommendation may include information (e.g., a document, text file, web page) providing software upgrade (e.g., operating system upgrade) recommendation(s), information regarding the impact(s) of a software upgrade, information associated with timing of the software upgrade, follow-up actions after the software update, and other information associated with the recommended software update. Remediation actions 136 may, in some cases, include system configuration setting changes, which may remediate a defect. Remediation actions 136 may also include, in some cases, instructions to take no action (e.g., in the case of a defect arising from user error).

In some embodiments, remediation actions 136 may be associated with defect(s), defection information 120, defect identifying data 122, defect symptom(s) 124, defect signature(s) 126, or other defect-related information. For example, remediation action(s) 136 may correspond to defect information 120, and a remediation action 136 may be configured to remedy or correct one or more defects.

In some embodiments, an association between a remediation action record 132 and one or more defects (e.g., defect information 120, defect symptoms 124, or defect signature(s) 126) may be included in metadata associated with a remediation action record 132, such that it may be determined that a remediation action 136 corresponds to, is related to, and/or will remediate the defect. In some embodiments, remediation action records 132 may include information associated with a defect. For example, remediation records 132 may include text, strings, or other information related to a defect.

According to some embodiments, a defect may be mapped to one or more remediation actions 136. The defect may be mapped based at least in part on a defect-based query against one or more structured remediation action records 132. In various embodiments, a remediation action record 132 may include data associating one or more remediation actions 136 with the remediation record 132. In some embodiments, if a remediation action record 132 is determined to be responsive to a defect-based query, then one or more remediation actions 136 associated with the responsive remediation action record 132 may be evaluated programmatically to determine which, if any, of the one or more remediation actions 136 associated with the responsive remediation action record 132 should be included in a remediation package 134 to be provided to remedy the defect.

In some embodiments, a query generator 160 may generate one or more defect-based queries 162 (e.g., defect queries) based at least in part on defect information 120. For example, a query based at least in part on one or more of defect information 120, defect symptoms 124, and/or defect signature(s) 126 may be generated to identify responsive remediation action records 132. The defect queries 162 may be stored in a database of queries 164. Defect queries 162 may include functions (e.g., Structured Query Language (SQL) functions, PostgreSQL (PL/pgSQL) functions, or other functions executed in any suitable language) configured to query a given data set (e.g., a table, index, array, or other data structure) based on defect information 120 and, possibly, additional parameters. The defect-based query 162 may be generated based on any of type of defect information 120 (e.g., as discussed above). In one example, a defect signature-based query 162 may include a regular expression (regexp), and defect information 120 may be represented as a regular expression pattern. In some embodiments, a query 162 may include logical operators (e.g., AND, OR, EITHER, IF, or any other logical operator(s)). Logical operators may be used to, for example, combine one or more defect information parameters to generate a customized query to identify a specific defect. Ultimately, a query 162 may be based on any combination of parameters, logical operators, techniques, and/or functions. In various embodiments, a query 162 invokes and makes use of a structure that has been imparted to remediation action records 132 in the course of generating structured records 132 based on received remediation information 130, to search for an association between a defect and a remediation action record 132 in an efficient and computationally feasible way. For example, in some embodiments, product development and/or support engineers assigned to document known defects and associated remediation information may be provided with a user interface to enter remediation information in a structured manner, enabling structured remediation action records 132 to be created and stored based on input received via the interface.

A defect-based query 162 may be performed against remediation action records 132 to determine which remediation records 132 are associated with which corresponding defect information 120. For example, if a defect-based query, based on parameters associated with a defect, against remediation record(s) 132 generates a positive result, it may be determined that the defect is associated with the remediation record(s) 132. Based at least in part on this determination, the defect may be mapped to remediation actions 132 associated with the structured remediation action records 132. For example, if a remediation action record 132 has been determined previously to be associated with a specific defect (e.g., identified by a unique identifier), and a defect in a particular system or group of systems has been determined to be associated with the same identifier, then that remediation action record 132 may be found in response to a query using the unique identifier as an argument. In another example, if a set of one or more defect symptoms have been determined to be associated with a remediation action record, then a query against the remediation action records which includes arguments based on those one or more symptoms may be returned as a record responsive to the query. In various embodiments, additional arguments may include information such as configuration data, version information, and/or dynamic or operational factors such as workload or performance/utilization statistics. In some embodiments, once responsive remediation action records 132 are found, additional filtering or other processing may be performed based on factors such as configuration, version, etc.

In some embodiments, remediation package(s) 134 are generated by, for example, a remediation engine 106. Remediation packages 134 may include remediation actions 136, data associated with a defect, and/or other information. A remediation package 134 may include, for example, a single payload (e.g., packet, file, etc.) including remediation actions 136, defect information, and other suitable information associated with serviced system 102.

According to some embodiments, a remediation package 134 may be sent, by system 100, to a destination associated with a defect. A destination associated with a defect may include, for example, a system (e.g., a serviced system 102), a destination associated with a user 108 (e.g., software engineering, technical support specialist, or any other user), or any other destination.

In some embodiments, sending the remediation package to a destination may include determining system(s) 102 associated with the defect and sending the remediation package to the one or more systems. Systems associated with a defect may include systems 102 in which the defect is present. In some embodiments, a defect query may be performed against diagnostic records 112 associated with each system in a group of systems to determine which systems have the defect. A remediation package 134 may then be sent to one or more of the systems which have the defect.

According to some embodiments, sending the remediation package to a destination may include determining user(s) associated with the defect and sending the remediation package to a destination associated with the user(s) 108. The one or more users associated with the defect may be determined based at least in part on defect-based query against a database of users 140.

In some embodiments, user(s) associated with a defect may be determined based on a domain and component 142 and/or other information associated with a user. A domain and component 142 and/or other information associated with a user may, for example, be stored in database of user information 140. In some cases, a user may be associated with a domain and component 142. A domain and component 142 may include a hierarchical structure for defining system(s) and components thereof. A domain may include a classification or feature of a product, and a component may include individual parts under a domain. For example, a domain may include hardware components of disk, power supply, CPU, and/or other components. A domain may also include software (e.g., redundant array of independent disks (RAID), input/output (IO)) which includes components of disk driver, serial attached SCSI (SAS) host bus adapter (HBA) firmware, multipath, and/or other components. A user (e.g., software developer, support engineer) may be associated with a domain and component 142 if, for example, that user has expertise with that domain and component 142.

Figure 2:
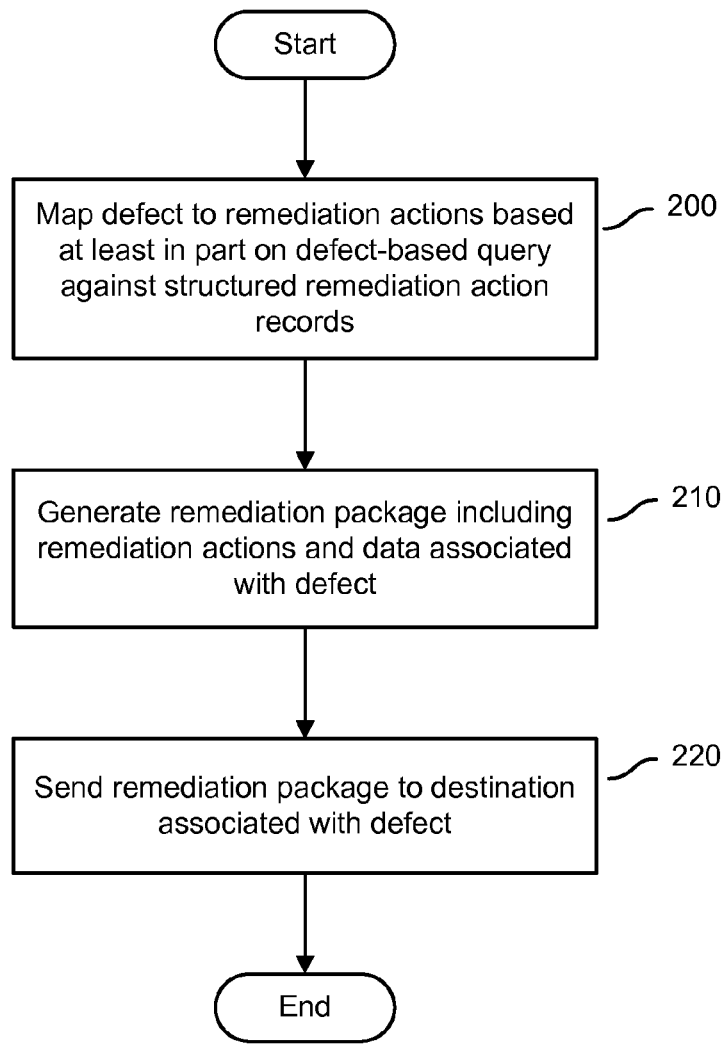
FIG. 2 is a flowchart illustrating embodiments of a process for defect remediation.

FIG. 2 is a flowchart illustrating embodiments of a process for defect remediation. In some embodiments, the process is performed by system 100 depicted in FIG. 1. At 200, a defect may be mapped to remediation actions based at least in part on a defect-based query against structured remediation action records. In some embodiments, a defect-based query may include a regular expression (regexp), and defect information (e.g., a defect identifying data 122, defect symptoms 124, of defect signatures 126 of FIG. 1) may be represented as regular expression patterns. In one example, a defect-based regular expression pattern may query for remediation action records including a text string (e.g., "test unit ready time out") representing a defect. A defect-based query may be generated that includes the regular expression pattern "test unit ready time out." The query may be performed against remediation action records. In the event that any of the remediation action records include the text/string "test unit ready time out," execution of the query would generate a positive result. Based at least on this positive result, it may be determined that the remediation action record is associated with a defect including a "test unit ready time out" symptom.

At 210, a remediation package may be generated including the remediation actions and data associated with the defect. Remediation actions may include the remediation actions discussed above or any other suitable information/data. Data associated with the defect may include defect identifying data (e.g., a bug identifier, defect description information, knowledge base article(s) related to the defect), defect symptoms, defect signature(s), and/or any information related to a defect. Other information related to the defect may include a number of times a defect has been diagnosed as being associated with a system (e.g., a particular hardware and software version), a number of times a particular serviced system has had a defect (e.g., over a period of time), and/or other suitable defect-related information. According to some embodiments, the remediation package may also include other suitable information related to the defect and/or remediation actions. By way of example, a remediation package may include defect correction/fix information (e.g., software version(s) including the fix) along with a recommendation to upgrade/update hardware and/or software associated with a system. For example, the remediation package may include information indicating where remediation action information may be obtained (e.g., a link to a document including remediation actions).

At 220, the remediation package may be sent to a destination associated with the defect. A destination associated with a defect may include, for example, a system (e.g., a serviced system), a destination associated with a user (e.g., software engineering, technical support specialist, or any other user), or any other destination.

In some embodiments, the remediation package may be sent to a destination associated with the defect based on one or more deployment policies. Deployment policies may include, for example, a policy as to the scope of deployment. For example, a scope-related policy may dictate that the remediation actions be broadcast to all systems running a certain revision of the software operating system. This is one example, but many different types of deployment policies may be implemented (e.g., deployment(s) over time, deployment(s) only to systems associated with certain users or customers, phased deployment(s), and so on). The process of sending a remediation package to a destination associated with the defect is discussed in more detail below with reference to FIG. 3.

Figure 3:
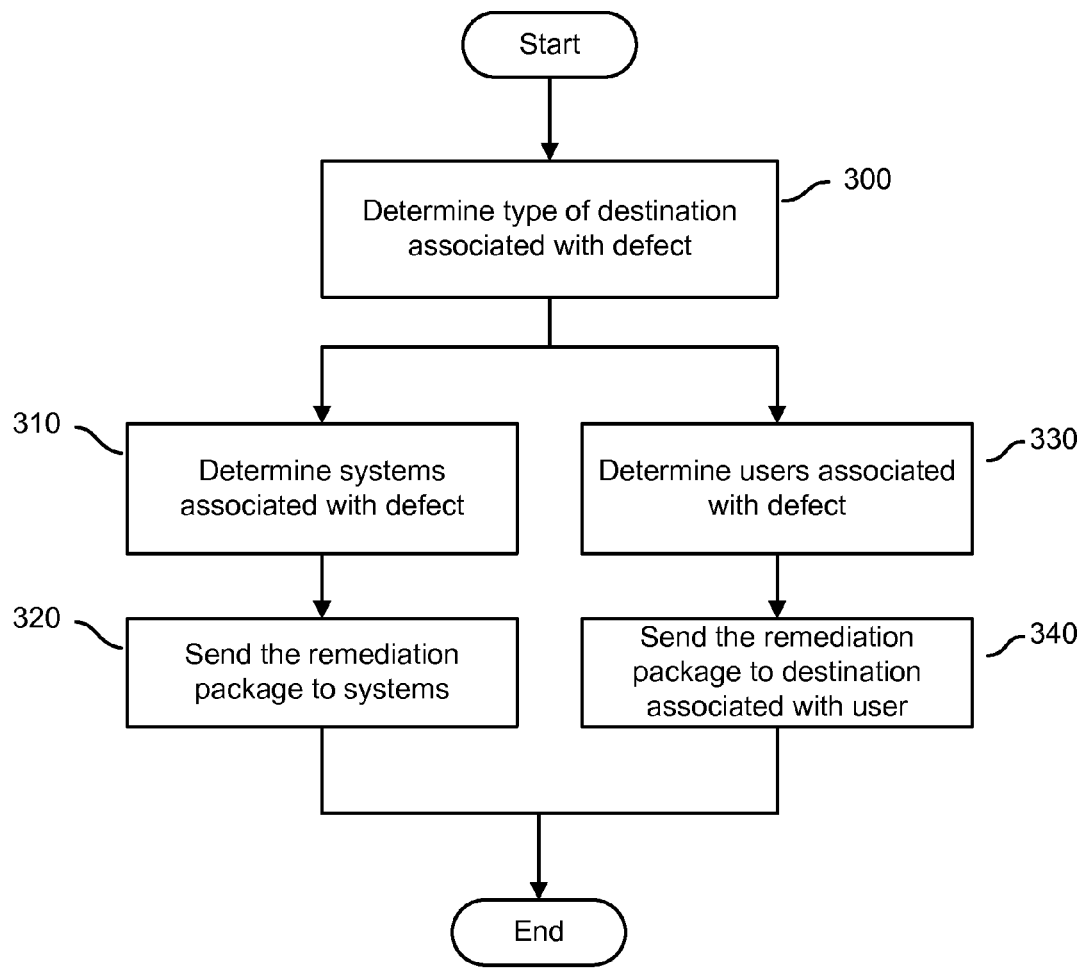
FIG. 3 is a flowchart illustrating embodiments of a process for sending a remediation package.

FIG. 3 is a flowchart illustrating embodiments of a process for sending a remediation package. In some embodiments, the process is performed by system 100 depicted in FIG. 1. At 300, a type of destination associated with a defect is determined. A type of destination may include, for example, a system associated with a defect (e.g., one or more systems including the defect), a destination associated with one or more users, or another type of destination (not shown). Further, a defect may be associated with multiple types of destinations (e.g., systems, destinations associated with a user, and other destinations). As such, steps 310 and 320 as well as 330 and 340 discussed below may be executed in parallel (e.g., substantially in parallel).

At 310, one or more systems associated with a defect may be determined. In some embodiments, the one or more systems may be determined based at least in part on a defect-based query against diagnostic data associated with at least one system in a group of systems. Systems associated with a defect may include systems in which the defect is present. In some embodiments, a defect-based query may be performed against diagnostic records associated with each system in a group of systems to determine which systems have the defect. For example, a defect-based query against system diagnostic data associated with a system that generates a positive result (e.g., a match, correlation, hit) may indicate the presence of a defect in the system.

At 320, a remediation package may be sent to the systems which have the defect. In some embodiments, the remediation package sent to the systems may include remediation actions including instructions configured to be performed/executed by the one or more systems. For example, the remediation actions may include machine-executable instructions, which when executed correct the defect (e.g., install a patch to correct the defect, update the operating system software, restart the system). Any other type of remediation actions, including but not limited to those discussed above, may also be sent to a system.

In some embodiments, the remediation package (e.g., machine-executable instructions) may be sent to the system based at least in part on one or more deployment approaches. In one deployment approach, remediation actions included in a remediation package may be configured to be automatically executed upon receipt at a system (e.g., serviced system 102 of FIG. 1). In other approaches, remediation actions (e.g., script(s)/instruction(s)) included in a remediation package may be configured to be automatically performed upon approval (e.g., from a user of the serviced system). In this case, a prompt may be output at a serviced system (e.g., via a graphical user interface) requesting permission to install as software patch or perform any other remediation action. In further approaches, the remediation actions may be configured to be manually executed (e.g., by a user) upon receipt at a serviced system.

At 330, one or more users associated with a defect may be determined. Users associated with a defect may include users with expertise regarding the defect (e.g., support engineers, software engineers, technical support personnel), a user associated with a system that has the defect (e.g., the owner of a system), or any other users. The one or more users associated with the defect may be determined based at least in part on defect-based query against a database of users. For example, a database of users may include user information associated with one or more users, and the user information may include defect information. In this case, a defect-based query may be performed against the user information to determine any users associated with a defect. For example, a user may be associated with a defect if user (e.g., a software engineer) has experience/expertise with the subject matter included in the defect information associated with the defect.

In some embodiments, user(s) associated with a defect may be determined based on a domain and component and/or other information associated with a user. For example, a defect-based query may include parameters associated with a domain and control. This defect-based query including parameters associated with a domain and control may be executed against user information including domain and control information for one or more users. In the event that the defect-based query generates a match/correlation with respect to one or more users, those one or more users may be determined to be associated with the defect.

At 340, a remediation package may be sent to a destination associated with the determined user(s). In some embodiments, a destination associated with a user may include a computing device associated with a user, a network address associated with a user (e.g., an email address), or any other type of destination.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of defect remediation, comprising:
   mapping a defect to one or more remediation actions, at least in part by using a processor to generate and perform a defect-based query against one or more structured remediation action records;
   using the processor to generate a remediation package including the one or more remediation actions and data associated with the defect;

determining whether a type of destination associated with the defect from a plurality of destination types is at least one or more systems associated with the defect or one or more users associated with the defect, or both;

determining a destination associated with the defect based at least in part on the determined destination type, wherein:

in the event the type of destination is determined to be the one or more systems associated with the defect, determining the one or more systems associated with the defect based at least in part on a defect-based query against diagnostic data associated with at least one system in a group of systems, in the event the type of destination is determined to be the one or more users associated with the defect, determining the one or more users associated with the defect based at least in part on a defect-based query against a database of user information associated with a group of users; and sending the remediation package to the destination associated with the defect.

2. The method of claim 1, wherein in the event the type of destination is determined to be the one or more systems associated with the defect, the sending step comprises
sending the remediation package to the determined one or more systems.

3. The method of claim 2, wherein the one or more remediation actions are configured to be performed by the determined one or more systems based at least in part on one or more deployment approaches.

4. The method of claim 2, wherein the defect-based query against diagnostic data associated with at least one system in a group of systems is based at least in part on the defect.

5. The method of claim 1, wherein in the event the type of destination is determined to be the one or more users associated with the defect, the sending step comprises:
sending the remediation package to a destination associated with the one or more users.

6. The method of claim 5, wherein:
the defect-based query against a database of user information associated with a group of users is based at least in part on a domain and a component associated with the defect; and
the user information includes a domain and component associated with each user in the group of users.

7. The method of claim 1, wherein the sending step includes sending the remediation package to the destination based at least in part on one or more deployment policies.

8. The method of claim 1, wherein the remediation package further comprises remediation information associated with the defect.

9. The method of claim 1, wherein the remediation package further comprises instructions defining when to perform the remediation actions.

10. The method of claim 1, wherein the one or more remediation actions comprise one or more machine-executable scripts.

11. A system for defect remediation, comprising:
a processor; and
a memory coupled with the processor, wherein the memory is configured to provide the processor with instructions which when executed cause the processor to:
map a defect to one or more remediation actions, at least in part by generating and performing a defect-based query against one or more structured remediation action records;

generate a remediation package including the one or more remediation actions and data associated with the defect;

determine whether a type of destination associated with the defect from a plurality of destination types is at least one or more systems associated with the defect or one or more users associated with the defect, or both;

determine a destination associated with the defect based at least in part on the determined destination type, wherein:

in the event the type of destination is determined to be the one or more systems associated with the defect, determining the one or more systems associated with the defect based at least in part on a defect-based query against diagnostic data associated with at least one system in a group of systems, in the event the type of destination is determined to be the one or more users associated with the defect, determining one or more users associated with the remediation package based at least in part on a defect-based query against a database of user information associated with a group of users; and send the remediation package to the destination associated with the defect.

12. The system of claim 11, wherein in the event the type of destination is determined to be the one or more systems associated with the defect, the instructions for sending the remediation package include instructions for
sending the remediation package to the determined one or more systems.

13. The system of claim 12, wherein the one or more remediation actions are configured to be performed by the determined one or more systems based at least in part on one or more deployment approaches.

14. The system of claim 12, wherein the defect-based query against diagnostic data associated with the one or more systems is based at least in part on the defect.

15. The system of claim 11, wherein in the event the type of destination is determined to be the one or more users associated with the defect, the instructions for sending the remediation package include instructions for
sending the remediation package to a destination associated with the one or more users.

16. The system of claim 15, wherein:
the defect-based query against a database of user information associated with a group of users is based at least in part on a domain and a component associated with the defect; and
the user information includes a domain and component associated with each user in the group of users.

17. The system of claim 11, wherein the instructions for sending the remediation package include instructions for sending the remediation package to the destination based at least in part on one or more deployment policies.

18. A computer program product for defect remediation, the computer program product being embodied in a tangible non-transitory computer readable storage medium and comprising computer instructions for:
mapping a defect to one or more remediation actions, at least in part by generating and performing a defect-based query against one or more structured remediation action records;

generating a remediation package including the one or more remediation actions and data associated with the defect;

determining whether a type of destination associated with the defect from a plurality of destination types is at least one or more systems associated with the defect or one or more users associated with the defect, or both;

determining a destination associated with the defect based at least in part on the determined destination type, wherein:

in the event the type of destination is determined to be the one or more systems associated with the defect, determining the one or more systems associated with the defect based at least in part on a defect-based query against diagnostic data associated with at least one system in a group of systems, in the event the type of destination is determined to be the one or more users associated with the defect, determining the one or more users associated with the defect based at least in part on a defect-based query against a database of user information associated with a group of users; and sending the remediation package to the destination associated with the defect.

19. The computer program product of claim 18, wherein in the event the type of destination is determined to be the one or more systems associated with the defect, sending the remediation package comprises;

and sending the remediation package to the determined one or more systems.

20. The computer program product of claim 18, wherein in the event the type of destination is determined to be the one or more users associated with the defect, sending the remediation package comprises sending the remediation package to a destination associated with the one or more users.

* * * * *